United States Patent
Waddell et al.

(10) Patent No.: US 9,377,871 B2
(45) Date of Patent: Jun. 28, 2016

(54) SYSTEM AND METHODS FOR DETERMINING KEYBOARD INPUT IN THE PRESENCE OF MULTIPLE CONTACT POINTS

(71) Applicant: Nuance Communications, Inc., Burlington, MA (US)

(72) Inventors: Gordon Waddell, Seattle, WA (US); Claes-Fredrik Mannby, Vashon, WA (US)

(73) Assignee: Nuance Communications, Inc., Burlington, MA (US)

( * ) Notice: Subject to any disclaimer, the term of this patent is extended or adjusted under 35 U.S.C. 154(b) by 5 days.

(21) Appl. No.: 14/450,095

(22) Filed: Aug. 1, 2014

(65) Prior Publication Data

US 2016/0034046 A1    Feb. 4, 2016

(51) Int. Cl.
| | |
|---|---|
| *G06F 3/023* | (2006.01) |
| *G06F 3/0488* | (2013.01) |
| *G06F 3/0489* | (2013.01) |
| *G06F 17/27* | (2006.01) |
| *G06F 3/041* | (2006.01) |

(52) U.S. Cl.
CPC ............ *G06F 3/0237* (2013.01); *G06F 3/0418* (2013.01); *G06F 3/04886* (2013.01); *G06F 3/04895* (2013.01); *G06F 17/276* (2013.01); *G06F 2203/04104* (2013.01)

(58) Field of Classification Search
CPC ........... G06F 1/00; G06F 3/017; G06F 3/016; G06F 3/011; G06F 3/167; G06F 3/005; G06F 3/012; G06F 3/013
See application file for complete search history.

(56) References Cited

U.S. PATENT DOCUMENTS

| | | |
|---|---|---|
| 5,963,666 A | 10/1999 | Fujisaki et al. |
| 7,030,863 B2 | 4/2006 | Longe et al. |
| 7,098,896 B2 | 8/2006 | Kushler et al. |
| 7,117,144 B2 | 10/2006 | Goodman et al. |
| 7,129,932 B1 | 10/2006 | Klarlund et al. |
| 7,218,249 B2 | 5/2007 | Chadha |
| 7,259,751 B2 | 8/2007 | Hughes et al. |
| 7,277,088 B2 | 10/2007 | Robinson et al. |
| 7,287,026 B2 | 10/2007 | Oommen |

(Continued)

OTHER PUBLICATIONS

International Search Report and Written Opinion for International Application No. PCT/US2012/023884, mailing date Sep. 3, 2012, 8 pages.

(Continued)

*Primary Examiner* — Michael Faragalla
(74) *Attorney, Agent, or Firm* — Perkins Coie LLP

(57) ABSTRACT

System and methods are provided for interpreting multiple contact events detected on a virtual keyboard of a computing device to determine an intended key press. The systems and methods utilize event data collected from each of the multiple contact events on a touchscreen in order to provide a general confidence level at which each contact event is deemed to be an intended key press. The confidence level is based on a probabilistic/algorithmic assessment of various criteria for each contact event detected. The criteria may be variable and rely on other events detected on the virtual keyboard even though each contact event is considered a physically independent action from one another. Once an intended key is determined, that key may be input to a word predication application also stored on the computing device. The word prediction application may use the intended key to predict at least one word for the user.

19 Claims, 10 Drawing Sheets

(56) References Cited

U.S. PATENT DOCUMENTS

| | | |
|---|---|---|
| 7,319,957 B2 | 1/2008 | Robinson et al. |
| 7,385,591 B2 | 6/2008 | Goodman et al. |
| 7,414,613 B2 | 8/2008 | Simelius et al. |
| 7,453,439 B1 | 11/2008 | Kushler et al. |
| 7,542,029 B2 | 6/2009 | Kushler |
| 7,602,377 B2 | 10/2009 | Kim et al. |
| 7,689,588 B2 | 3/2010 | Badr et al. |
| 7,777,728 B2 | 8/2010 | Rainisto |
| 7,810,030 B2 | 10/2010 | Wu et al. |
| 7,829,812 B2 | 11/2010 | Tolbert et al. |
| 7,912,700 B2 | 3/2011 | Bower et al. |
| 7,920,132 B2 | 4/2011 | Longe et al. |
| 7,957,955 B2 | 6/2011 | Christie et al. |
| 8,131,268 B2 | 3/2012 | O'Connell et al. |
| 8,201,087 B2 | 6/2012 | Kay et al. |
| 8,589,149 B2 | 11/2013 | Cecil et al. |
| 8,666,728 B2 | 3/2014 | Rigazio et al. |
| 9,043,725 B2 | 5/2015 | Wakefield et al. |
| 2004/0136564 A1 | 7/2004 | Roeber et al. |
| 2004/0183833 A1 | 9/2004 | Chua |
| 2005/0114115 A1 | 5/2005 | Karidis et al. |
| 2005/0289463 A1 | 12/2005 | Wu et al. |
| 2006/0176283 A1 | 8/2006 | Suraqui |
| 2007/0188472 A1 | 8/2007 | Ghassabian et al. |
| 2007/0211923 A1 | 9/2007 | Kuhlman |
| 2008/0119217 A1 | 5/2008 | Coxhill et al. |
| 2008/0133222 A1 | 6/2008 | Kogan et al. |
| 2008/0138135 A1 | 6/2008 | Gutowitz |
| 2009/0089666 A1 | 4/2009 | White et al. |
| 2009/0109067 A1 | 4/2009 | Burstrom et al. |
| 2009/0249198 A1 | 10/2009 | Davis et al. |
| 2009/0262078 A1 | 10/2009 | Pizzi et al. |
| 2009/0328101 A1 | 12/2009 | Suomela et al. |
| 2010/0225591 A1 | 9/2010 | Macfarlane |
| 2010/0304704 A1 | 12/2010 | Najafi et al. |
| 2010/0321299 A1 | 12/2010 | Shelley et al. |
| 2011/0018812 A1 | 1/2011 | Baird |
| 2011/0119623 A1 | 5/2011 | Kim et al. |
| 2011/0193797 A1 | 8/2011 | Unruh |
| 2011/0248924 A1 | 10/2011 | Bhattacharjee |
| 2011/0248948 A1* | 10/2011 | Griffin .................. G06F 3/041 345/174 |
| 2011/0264442 A1 | 10/2011 | Huang et al. |
| 2012/0047454 A1 | 2/2012 | Harte |
| 2012/0203544 A1 | 8/2012 | Kushler |
| 2012/0235938 A1* | 9/2012 | Laubach ............... G06F 3/0416 345/173 |
| 2012/0254744 A1 | 10/2012 | Kay et al. |
| 2013/0063384 A1* | 3/2013 | Ito ..................... G01C 21/3664 345/173 |
| 2013/0120278 A1 | 5/2013 | Cantrell |
| 2014/0074458 A1 | 3/2014 | Cecil et al. |
| 2014/0198047 A1 | 7/2014 | Unruh et al. |
| 2014/0198048 A1 | 7/2014 | Unruh et al. |

OTHER PUBLICATIONS

International Search Report for International Application No. PCT/US2014/011538, mailing date Apr. 16, 2014, 3 pages.

U.S. Appl. No. 13/830,674, filed Mar. 14, 2013, Unruh et al.

* cited by examiner

SYSTEM AND METHODS FOR DETERMINING KEYBOARD INPUT IN THE PRESENCE OF MULTIPLE CONTACT POINTS

BACKGROUND

With the emergence of smartphones, tablets, and hybrid devices (e.g., mini tablets) and with the integration of touch interface technology onto computers, users are capable of providing inputs to those computing device through an additional input element: touchscreens. Touchscreen displays are now an industry standard on cellular telephones, tablets, laptops and even some desktop computers.

A touchscreen allows users to combine various traditional input elements, e.g., a traditional mouse and keyboard, into one by combining the functionality of each element into one device. In order provide this functionality, the touchscreen often displays a virtual keyboard to users when keyed entries are required. The displayed keyboard is generated either automatically by an application or at the user's request. Because of the size of the device on which they are incorporated, displayed virtual keyboards typically include input keys that are a fraction of the size of keys on traditional keyboards. Additionally, since the keys of a virtual keyboard are displayed on a flat display screen, the keys lack the borders and feel of a physical button. The size and lack of three-dimensional depth can make it difficult for a user to differentiate between keys and, subsequently, key presses.

With portions of the virtual keyboard being touched unintentionally on a regular basis, typing on a virtual keyboard regularly results in typographic errors. On devices having larger touchscreens, errors can be more easily avoided due to key size and key spacing on the relatively larger virtual keyboard. However, as devices decrease in size it becomes increasingly difficult for users to properly input text on the correspondingly smaller keyboards. To combat this problem, solutions have been developed which predict possible words that a user may be typing; however, this can only be accomplished if the user's key press is intended, e.g., the user purposely touches a key or series of keys.

Therefore, the need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1:
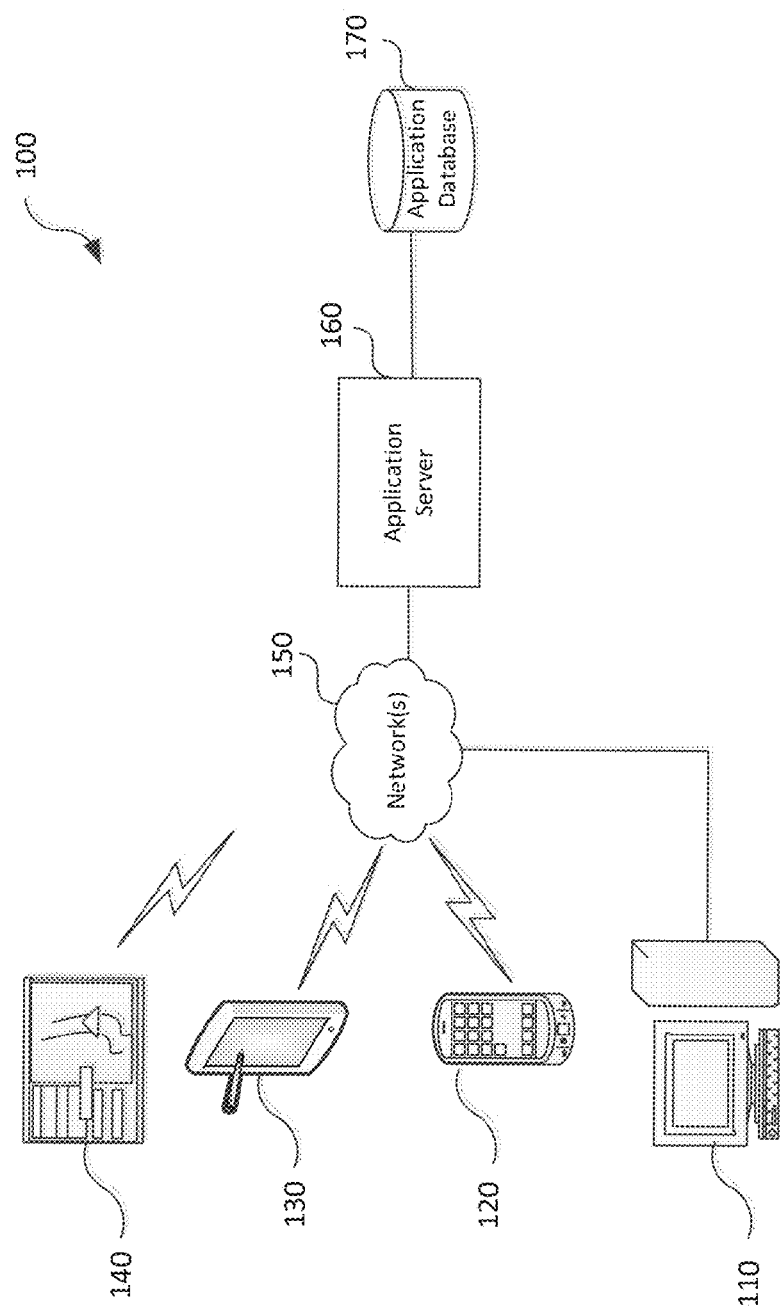
FIG. 1 illustrates an example of a computing environment in which some embodiments of the present invention may be implemented.

A system and methods for interpreting multiple contact events on a virtual keyboard displayed on a touchscreen of a computing device in order to determine whether a key or keys was intended to be pressed by a user is disclosed herein. For purposes of this description, a "contact event" is a detected touch on a touchscreen, whether initiated by user finger, stylus, hand, pointing apparatus, or any other means of providing a touch that is detectable by the touchscreen. The touch can also be virtual or implied, e.g., non-physical touches, determined by interpolation of area-based motions using plane analysis. The system and methods utilize data collected from each of the multiple contact events to calculate a general confidence level of whether each of the multiple contact events is deemed to be an intended key press. The confidence level is based on a probabilistic/algorithmic assessment of various criteria for each detected contact event. The criteria may rely on other contact events detected on the virtual keyboard even though each of the multiple contact events is considered a physically independent action from one another. Additionally, the criteria may accrue (build on one another), such that each subsequent criteria depends on a favorable outcome of the preceding one.

Algorithms based on various factors may be used to determine key presses based on variable thresholds that change over time. The factors considered when determining an intended key press can vary substantially based on the detected contact event. However, comparing each detected contact event to a set of base thresholds can eliminate (i.e., rule out) many of the contact events as representing an intended key press. Moreover, those base thresholds that are satisfied may also determine the additional factors which may be assessed. The set of base thresholds may include, for example, thresholds related to a duration of the detected contact event, a size or shape of the detected contact event and, subsequently, a location of the detected contact event.

As a first factor, a duration of a detected contact event can be utilized to determine if a contact event is an intended key press or not. For example, if the duration of a detected contact event is a considerably long amount of time, e.g., >2 seconds, the system may assume that the user is merely resting a hand or finger at the location of the detected contact event and is not intending to press a corresponding key at that location. In contrast, if the duration of the detected contact event is extremely short, e.g., <0.1 seconds, the system may assume that the detected contact event was inadvertent and that the user is similarly not intending to press the corresponding key.

As a second factor, the size and shape of a detected contact event may also be utilized to assess whether the contact event is an intended key press or not. The size of the contact event may be measured by a surface area of the contacted portion of the touchscreen. If the size of the contact event is less than a threshold value, the system may discard the contact event as accidental because the intended key press would typically include a more deliberate interaction with the virtual keyboard, causing a larger size contact event to be detected. Similarly, if the detected contact event size is too large (i.e., the size is greater than a second threshold value) the system may further assess other characteristics of the contact event, e.g., the duration of the contact event, to better characterize the type of contact event. For example, the user may be resting on the touchscreen or may have performed a swiping action during typing that results in an extended screen touch. The surface area and shape of the detected contact event can also be used to as a factor to assess whether the contact event is an intended key press or not. A basic oval shape is often detected on a keyboard when a contact event is an intended key press. The more that a contact event varies from an oval pattern, however, the greater the likelihood that the contact event indicates an accidental touch to the touchscreen of the computing device.

A third factor that may be considered by the system when determining if a contact event is an intended key press is the distance of the detected contact event from the resting position of the user's hands/fingers on the virtual keyboard. For example, if a user typically rests fingers on the home keys and a contact event is detected at the location of the "Y" key, then the likelihood that a user mistakenly touched that key is less than if the contact event is detected at the location of the "G" key. The distance can be considered as the distance from a predetermined starting point on the virtual keyboard, such as a distance from the home or from another predetermined starting point.

Once a contact event is determined to be an intended key press (e.g., a press of the "H" or "I" keys), that key press can be further processed by a word prediction application to predict various words and/or phrases in which the intended key is included. By combining one or more of the above factors, the disclosed system and methods can be advantageously used to facilitate touch typing on a touchscreen. In particular, a user can rest their fingers on the home row of a virtual keyboard without having to keep their fingers elevated above the keys. The system detects when new contact events (other than those associated with the resting of the fingers on the home row) reflect an intended key press. Such technology greatly improves the experience of typing on a touchscreen. Various implementations of the invention will now be described with reference to the aforementioned embodiments as well as additional embodiments within the scope of the invention.

The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

I. Systems

The discussion herein provides a brief, general description of a suitable computing environment in which aspects of the present invention can be implemented. Although not required, aspects of the system are described in the general context of computer-executable instructions, such as routines executed by a general-purpose computer, e.g., mobile device such as a smartphone, tablet, notebook or laptop computer, a server computer, or personal computer. Those skilled in the relevant art will appreciate that the system can be practiced with other communications, data processing, or computer system configurations, including: Internet appliances, hand-held devices (including personal digital assistants (PDAs)), all manner of cellular or mobile phones, wearable computers, embedded systems, vehicle-based computers, multi-processor systems, microprocessor-based or programmable consumer electronics, set-top boxes, network PCs, mini-computers, mainframe computers, and the like. Indeed, the terms "computer," and "mobile device" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM or flash semiconductor chips), nano-technology memory, biological memory, or other data storage media. Alternatively, computer implemented instructions, data structures, screen displays, and other data under aspects of the system may be distributed over the Internet or over other networks (including wireless networks). Those skilled in the relevant art will recognize that portions of the system may reside on a server computer, while corresponding portions reside on a client computer such as a mobile or portable device, and thus, while certain hardware platforms are described herein, aspects of the system are equally applicable to nodes on a network. Aspects of the invention will now be described with reference to the figures.

System Environment

A suitable or representative environment 100 in which the invention may be implemented is provided with reference to FIG. 1. FIG. 1 includes one or more communication networks 150 coupled to various devices capable of storing and running applications as well as communicating on the networks 150. For example, the devices may include a desktop computer 110, a mobile phone 120, a tablet computer 130, a GPS navigation system 140, a laptop computer (not shown), or other computing device. The devices 110, 120, 130, 140, can include various input mechanisms (e.g., microphones, keypads/keyboards, and/or touchscreens) to receive user inputs (e.g., voice, text, and/or handwriting inputs). In particular, devices with touchscreens include a virtual keyboard application stored on or accessible via the devices to allow users to enter text by typing or entering text via a virtual keyboard. In addition, the devices include an application stored on or accessible via the devices which interprets contact events on the virtual keyboard to facilitate data entry into a device.

An application server 160 configured to provide virtual keyboard software and/or interpretation application software and updates for that software to each of the devices is also illustrated. The virtual keyboard and/or interpretation application software may be stored in an application database 170 coupled to the application server 160. The application server 160 may be coupled to the networks 150 via a wireless or hard-wired connection, such as the Ethernet, IEEE 802.11, or other communication channel known in the art which is formed between the server and the network. Additional details of a mobile device, interpretation application and corresponding methods are further described with reference to the remaining figures.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirement for some embodiments but not for other embodiments.

Touchscreen Device

Figure 2:
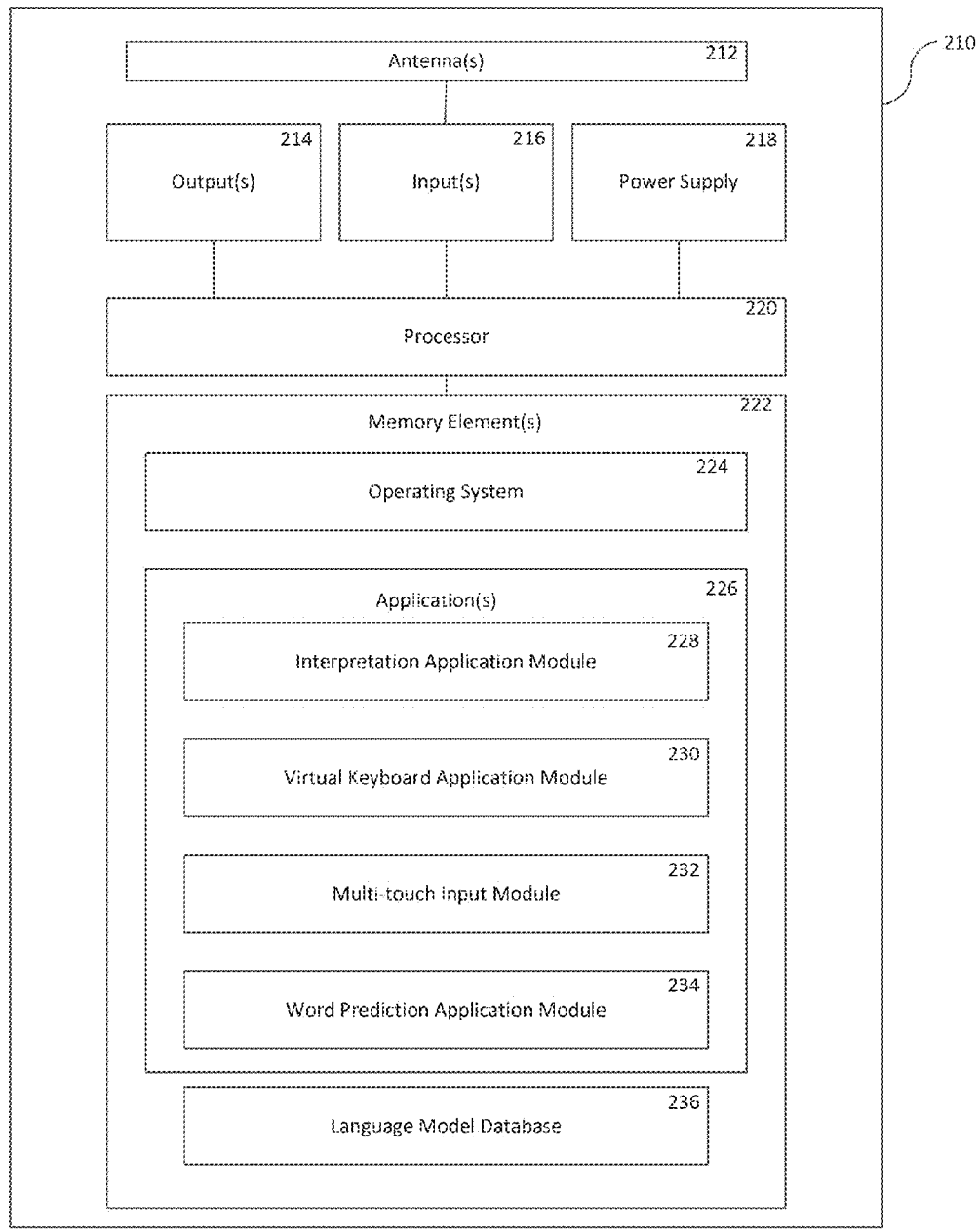
FIG. 2 is a block diagram of example components in a mobile device or suitable computing device capable of providing a virtual keyboard on a touchscreen display.

FIG. 2 illustrates an exemplary mobile device having a touchscreen that is used to implement the methods for interpreting contact events on the touchscreen as provided in the following description. In particular, FIG. 2 illustrates components of a mobile computing device 210 on which a virtual keyboard may be displayed for text entries by a user. The mobile device 210 is a computing device having a storage medium encoded with instructions capable of being executed by a processor to perform methods disclosed within those instructions. The mobile device 210 may be a smartphone, tablet computer, netbook, mobile GPS navigation device, e-reader, personal wireless device (e.g., mobile hotspot), or any other device which is capable of storing an application and generating a virtual keyboard on a touchscreen display of the mobile device 210. While not depicted in FIG. 2, many of the components in the mobile device 210 are also present in other suitable computing devices that implement the disclosed technology. For example, a surface or tabletop computer, desktop computer, server computer, or fixed telephone or communications console or apparatus may all have the same or similar components to those depicted in the mobile device 210.

The mobile device 210 is configured to record and temporarily store touchscreen contact events reflecting an interaction on or closely adjacent to a virtual keyboard on the mobile device 210. Each of the components within the mobile device 210 may be connected to a system bus (not shown) capable of transferring data between those components. Mobile device 210 also has a power supply 218, such as a battery, which is capable of providing power to each of the components within the mobile device 210.

The mobile device 210 includes one or more antennas 212 capable of communicating via radio networks with a cellular communications network (e.g., GSM, CDMA, 3G, 4G), a local wireless area network (WiFi), other devices using near field communication (NFC, RFID) or Bluetooth, and a satellite system (GPS). The antennas 212 may be coupled to a processor 220, which facilitates the sending and receiving of communication signals to/from the aforementioned networks.

Various input components 216 for receiving input signals and various output components 214 are also included in the mobile device 210. For example, the input components may include a touchscreen, keys or buttons, accelerometers, cameras, and a microphone. The output components 214 may include, for example, a speaker and a display. Each of the input components 216 and output components 214 are coupled to a processor 220, which is capable of executing certain functions of the mobile device 210 such as, receiving data from the input components 216, sending data to the output components 214, and storing and retrieving data from the memory elements 222 on the mobile device 210.

The touchscreen or other input component 216 provides one or more inputs to the processor 220 such as notifying the processor 220 of contact events when the touchscreen is touched. The touchscreen may include or communicate with a hardware controller, such as a touchscreen driver, that interprets raw signals received from the touchscreen and transmits information associated with the contact event to the processor 220. The contact event can be generated from, e.g., a finger or stylus touch on a touchscreen which indicates a request by a user to press a virtual key on the virtual keyboard displayed on the device 210. The data characterizing the contact event can include information on the current position of a pointing input device, a surface area (size and/or shape) of the contact points generated by the contact event, a pressure of the contact event, a duration of the contact event, and a location of the contact event (e.g., X-Y coordinates on the display screen of the device or a distance from a predetermined location on the display of the device).

The processor 220 may be a single processor or multiple specialized processors, such as a digital signal processor (DSP), application/graphics processor, or other types of processor, dependent on the additional components within the mobile device 210. The processor 220 is coupled to one or more memory elements 222 which may include a combination of temporary and/or permanent storage, and both read-only and writable memory, such as static and non-static random access memory (S/RAM), read-only memory (ROM), writable non-volatile memory such as FLASH memory, hard drives, SIM-based components, and other computer readable storage mediums. The processor 220 retrieves and stores data in memory element(s) 222 of the device 210, and executes applications 226 that are stored in the memory elements.

The memory element(s) 222 is/are encoded with various program components or modules, such as an operating system 224, various applications 226, such as those downloaded from an application store or database to the mobile device 210. In particular, the memory elements 222 may include an interpretation application module 228, or program, for interpreting contact events associated with a virtual keyboard and corresponding program subroutines. Additionally, the memory element 222 may include a virtual keyboard application module 230 for generating a virtual keyboard on the touchscreen of the mobile device 210, a multi-touch input module 232 for collecting the contact event data for the virtual keyboard, and a word predication application module 234 for predicting a word based on the detection of an intended key press. A language model database 236 may also be included to provide a selection of predictive words to the word prediction module 234.

As discussed herein, the mobile device 210 may include or store an interpretation application module 228 that provides information, such as probabilities that a contact event represents an intended key press, to a word prediction application module 234. The probabilities may be considered confidence levels at which the application should interpret each detected contact event to be an intended key press.

Any number of attributes characterizing a contact event may be collected by the mobile device 210 and through the interpretation application module 228. In some embodiments, the attributes or characteristics of the contact event may be detected or determined by the multi-touch input module of the mobile device 210 and stored in a temporary memory of that mobile device.

As previously mentioned, the interpretation application module 228 may be stored in a memory element 212 of the mobile device 210 and may be associated with the virtual keyboard application module 230 such that each time the virtual keyboard application module 230 is called, the interpretation application module 228 is also called. Accordingly, whenever the virtual keyboard is displayed on the device, the interpretation application module 228 is executed to interpret contact events made by the user and predict an intended (or desired) key press by the user. It will be appreciated that the interpretation application module 228 may also be integrated with the virtual keyboard application module 230 and/or the word prediction application module 234.

The virtual keyboard application module 230 causes the device to generate and display a virtual keyboard on a touchscreen input component 216. The keyboard may be a virtual keyboard emulating a physical keyboard, such as a keyboard that is implemented on a touch-sensitive surface, presented on a touch-sensitive display, imprinted on a touch-sensitive surface, and so on. Further details regarding suitable text input applications may be found in commonly-assigned U.S. Pat. No. 7,542,029, issued on Jun. 2, 2009, entitled SYSTEM AND METHOD FOR A USER INTERFACE FOR TEXT EDITING AND MENU SELECTION, which is incorporated by reference in its entirety. Further details regarding technologies that may be suitable for implementing in conjunction with the present invention may be found in commonly-assigned U.S. patent application Ser. No. 13/366,225, filed on Feb. 13, 2012, entitled CORRECTING TYPING MISTAKES BASED ON PROBABILITIES OF INTENDED CONTACT FOR NON-CONTACTED KEYS; commonly-assigned U.S. patent application Ser. No. 12/186,425, filed on Aug. 5, 2008, entitled A PROBABILITY-BASED APPROACH TO RECOGNITION OF USER-ENTERED DATA, commonly assigned U.S. patent application Ser. No. 13/830,674, filed on Mar. 14, 2013, and entitled REDUCING ERROR RATES FOR TOUCH BASED KEYBOARDS, each of which are incorporated by reference in their entirely.

The virtual keyboard application module 230 may also include an event detection component (not shown) to detect when a user interaction has occurred on the mobile device that warrants the use of the virtual keyboard. For example, if the user selects a text entry field in an electronic mail (email) application or selects a form field on a website page, the event detection component detects the user input as an event that requires a keyboard for text entry. The events detected by the event detection component then trigger the virtual keyboard application module 230 to present a virtual keyboard on a touchscreen display of the mobile device 210.

The virtual keyboard application module 230 may be responsible for removing the virtual keyboard from the display once the user has finished a session, i.e., finished a particular entry, as well as changing the size, language and position of the keyboard dependent on the user's preferences and physical position of the mobile device 210. In some embodiments, the virtual keyboard may be removed when one or more contact events exceed a predetermined threshold applied by the interpretation application 228 or when the device 210 goes into sleep mode.

The multi-touch input module 232 detects contact events between the user and the touchscreen. The multi-touch input module 232 is configured to receive input via the displayed keyboard and to detect characteristics of the detected contact events. The multi-touch input module 232 collects data related to each of the contact events detected on or near the virtual keyboard, such as the location (e.g., X-Y coordinates of the contact event), size (e.g., surface area covered by the contact event), duration (e.g., time passed at the contact event location), etc. The multi-touch input module 232 is further configured to detect any number of contact events simultaneously. Characteristics of the contact events are provided to the interpretation application module 228 which uses the characteristics to determine an intended key press by a user.

The word prediction module 234 receives the outputs from the interpretation application module 228, including the intended key presses determined from the multiple detected contact events on or near the virtual keyboard. The word prediction module 234 uses the intended key identified by the interpretation application module to predict different words that the user may be attempting to enter. The different possible words are displayed to the user, who can then either select the desired word (without having to enter the remaining letters in the word) or merely continue typing to enter the remaining letters in the word.

The device 210 may include other components (not shown) that facilitate operation of the device and its various components, including other input 216 or output 214 components, a radio and/or other communication components, a camera, a subscriber identity module (SIM), and so on. In general, the device 210 may store or contain any and all components, modules, or data files required or used in performing typing corrections, such as by interpretation and word prediction for text input applications provided by the device 210.

Methods for implementing the aforementioned application modules on a device such as illustrated in FIG. 2 are now described. Reference to particular components within that device may be indicated by a numerical identifier corresponding to FIG. 2.

II. Methods

Figure 3:
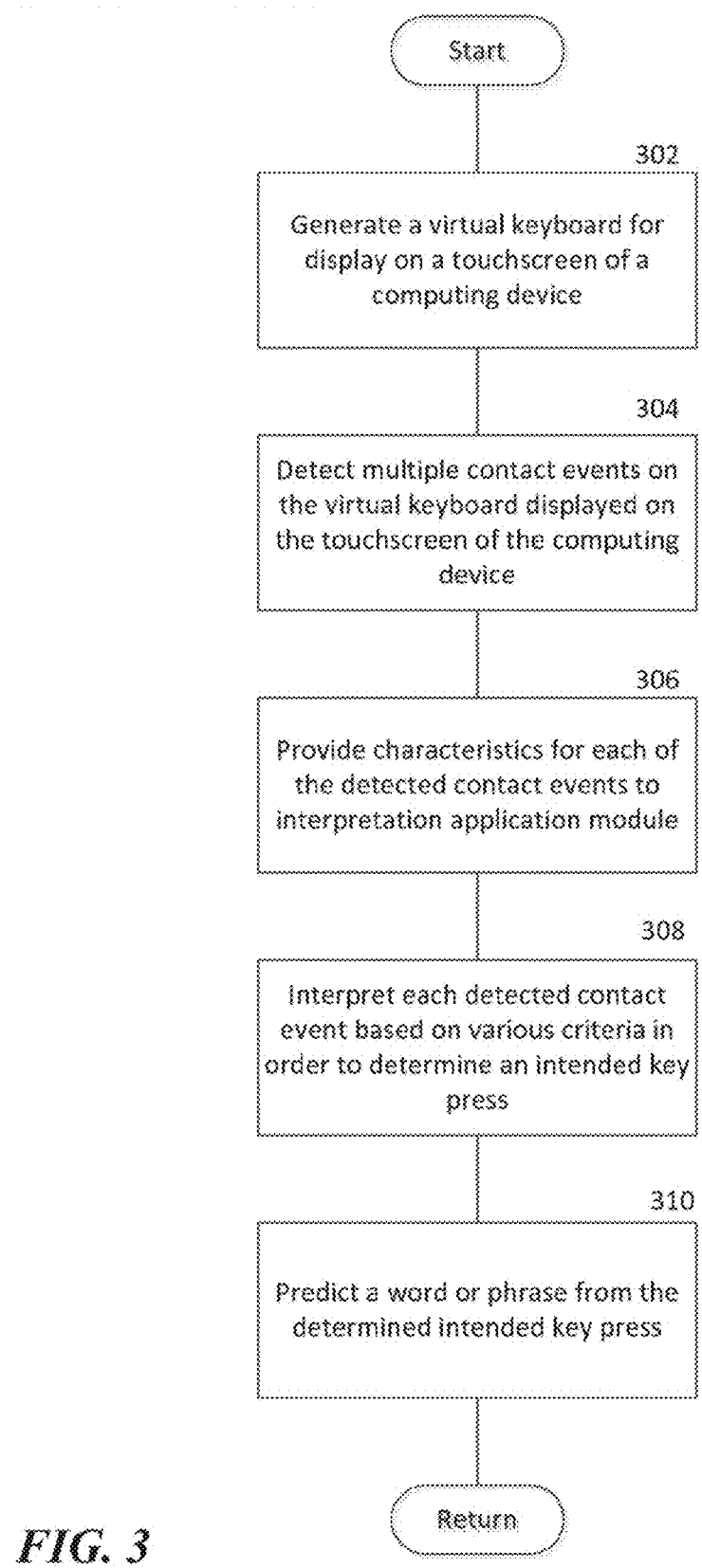
FIG. 3 is a flow diagram illustrating a method for detecting contact events on a virtual keyboard displayed on a touchscreen.
Figure 4:
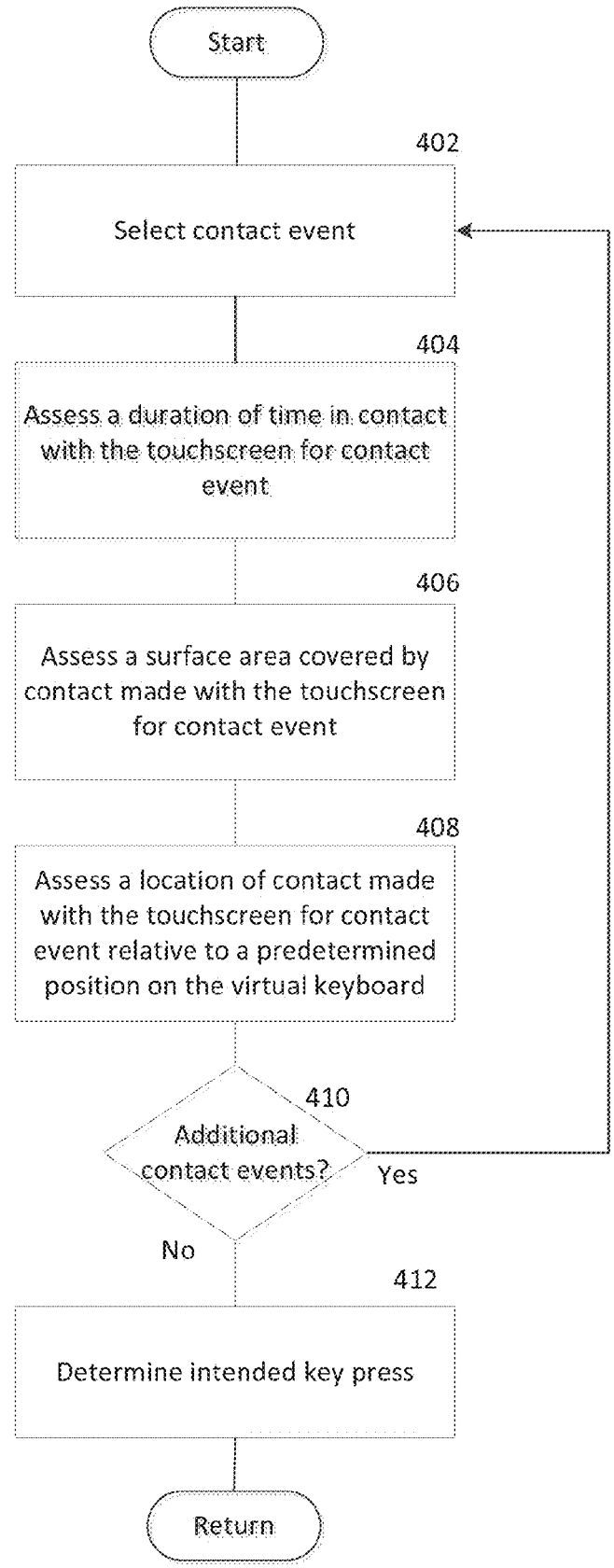
FIG. 4 is a flow diagram illustrating a method for interpreting contact events detected on a touchscreen.

FIGS. 3-4 are flow diagrams illustrating the use and implementation of the interpretation application module 228 (FIG. 2) on a mobile device. In particular, FIG. 3 is a flow chart depicting a method for interpreting multiple contact events on a touchscreen of mobile device to determine an intended key press and generate a word prediction based on the intended key press. FIG. 4 is flow chart of a method for interpreting detected contact events to determine the intended key press. Each of these methods is further discussed in the following paragraphs.

FIG. 3 depicts a method for detecting contact events on a virtual keyboard of an electronic device and interpreting the detected contact events in order to generate predictive text (e.g., recommended words based on the previously-entered keystrokes) for a user. Because the display screen of the device is flat and a user is not able to push a physical key down and receive physical feedback of the keystroke, users are more prone to typing mistakes with touchscreens. Accordingly, the device can include a software application that analyzes detected contact events to determine which events reflect a likely intended key press by the user. The resulting intended key press may then be further processed by a word prediction application to provide one or more predictive words based on the intended key.

To begin, in step 302, a virtual keyboard is generated for display on the touchscreen of a computing device, such as a mobile telephone or tablet computer. In some embodiments, the keyboard application is provided by the operating system of the device. The keyboard application may be always running, or "on", in the background of the device and called to the foreground when needed. For example, an application executing on the computing device may call the virtual keyboard in order for a user to enter text to that application. The virtual keyboard may be called automatically or by user command. As will be appreciated by one skilled in the art, the virtual keyboard may be displayed in a set location on the display of the device. The location may vary depending on the device orientation. The keyboard may vary in size relative to the display screen size of the computing device or relative to the size of the window in which the keyboard is viewable by the user. Once displayed, the keyboard application maintains a mapping of the locations of each key on the virtual keyboard and X-Y coordinates of the touchscreen. In other words, for each X-Y location associated with a contact event (e.g., touch by finger, stylus, or other entry device), the keyboard application is able to map the X-Y coordinate to a unique key.

At step 304, multiple contact events are detected on the touchscreen of the computing device. As previously mentioned, contact events may be detected based on known touchscreen techniques, such as using a capacitive, resistive or optical wave touchscreen technology. In some embodiments, any touches sensed outside the area in which the virtual keyboard is displayed on the touchscreen will be discarded. In other embodiments, specific rules may be implemented regarding the touches or touch patterns outside the area of the virtual keyboard that are to be considered contact events. When multiple contact events are detected on the virtual keyboard of device substantially simultaneously or within a relatively short predetermined time interval, the multiple detected contact events are processed by the interpretation application module to determine an intended key press. In some embodiments, the contact events may be detected based on touch down and touch ups of the input mechanism. The input mechanism may include a stylus, the user's hand, or other mechanism capable of interacting with the touchscreen of the device.

At step 306, the detected contact events and corresponding data, such as the characteristics of each contact event, are provided for analysis to the interpretation module. Any number of characteristics may be provided to assist the interpretation module in determining whether a contact event is an intended key press or an accidental key press. For example, characteristics of a contact event can include duration, size, location, shape, etc. The duration is the length of time (e.g., in seconds or milliseconds) that the user's finger or other input mechanism was interacting with the touchscreen of the computing device. The size is the surface area that is covered by the user's finger or other input mechanism during the interaction with the touchscreen of the device. The surface area can be measured as an aggregate of a surface area touched during a time interval spanned by first contact (e.g., touch down) and last contact (e.g., touch up) with the touchscreen. In alternative embodiments, to account for minor movements made during contact, the surface area can be calculated as the mean area covered during the aforementioned time interval between touch down and touch up. The surface area can also be calculated by the area covered when a first contact is made with the touchscreen, e.g., touch down, with any other surface area caused by movement of the user's input mechanism ignored. The location of a contact event can be an X-Y coordinate of the contact event, as measured at a centroid of the contact event. Alternatively or additionally, the location of the contact event can be specified as a relative distance measured from a reference position. For example, the location of a contact event associated with a keyboard may be provided as an offset from a certain location of the keyboard (e.g., a center of a keyboard). The shape of a contact event is a characterization of the area of the contact event. For example, the contact event may be circular in shape for a perpendicular touch of the touchscreen, or may be more oval in shape for a touch that is less than perpendicular.

At step 308, the detected contact events and corresponding characteristics of each contact event are assessed by an interpretation application to determine which contact event is most likely to be the intended key that was pressed by the user. For example, if a user presses the "T" key and slightly presses the "D" key while doing so, the interpretation application can process both contact events and determine that the "T" key is the intended key while the "D" key was a ghost touch made to that intended key. The interpretation application can analyze and compare any number of contact event characteristics independently or in conjunction with characteristics of other contact events being analyzed at the same time. For example, as mentioned above, the proximity of contact events or duration of contact events, etc. may be used to assess the likelihood of which contact event represents a key press. Once the contact events have been analyzed, probabilities associated with each characteristic corresponding to a particular contact event can be summed or otherwise combined to provide a confidence level of that contact event being the intended key press. The confidence level reflecting whether the contact event represents an intended key press can be expressed as a percentage. These and additional steps for interpreting the contact events are further discussed with reference to FIG. 4.

Finally, at step 310, the intended key press, as determined by the interpretation application, is input into a prediction application, or algorithm, in order for one or more predictive words to be selectively displayed to the user. The partial words, word pair, or long words can be compared with a language model (e.g., an n-gram model with associated probabilities) (e.g., language model database 236 in FIG. 2), that is stored in a memory element of the computing device. The language model is used to process a received character string based on common use training data associated with the user of the device and/or the general population. The language model can be shortened version and the predicted words within that model can include words commonly used both by the general population as well as specific to the user of the computing device.

FIG. 4 depicts a method for interpreting contact events detected on or near a virtual keyboard of a computing device. In the depicted method, three base factors are assessed for each of the detected contact events in order to ascertain a confidence level that any one particular contact event is an intended key pressed by the user. While three factors are depicted, it will be appreciated that utilizing less or more base factors is also within the scope of the invention.

At step 402, one of the contact events from the multiple detected contact events is selected by the system. At step 404, the selected contact event is evaluated by the system to determine an associated duration of time during which the input mechanism is interacting with the touchscreen. For example, the contact event is evaluated to determine the duration of time that a user's finger is in contact with a particular point on the touchscreen of the device. The duration of time may be measured in seconds or a fraction thereof. Additionally, the duration of time may be measured in relation to the start or stop times of contact events in the multiple contact events detected at the same time. For a contact event to be interpreted as an intended key press, the duration of the contact event should fall within a predetermined time interval bounded by a lower threshold value and a higher threshold value. Contact events falling below the lower threshold value may be considered accidental interactions with the touchscreen. Contact events falling above the higher threshold value may be considered resting locations. These time limits are further discussed with reference to FIG. 6A.

At step 406, the selected contact event is further assessed by the system to determine the surface area encompassed by the user's interaction with the touchscreen. The surface area may be measured, for example, in square centimeters, square millimeters, or number of pixels. The surface area can be approximate and can be determined by the outermost points of the shape detected on the touchscreen. In some embodiments, if the surface area extends across the virtual keyboard past a threshold distance (e.g., a swipe), the contact event is discarded as an accidental touch. In some embodiments, if the detected surface area is sufficiently small, the device can discard the contact event as an accidental or ghost touch. If the surface area is sufficiently large in a fixed area, the system can discard the contact event as a resting point on the touchscreen. The threshold surface areas for the contact event are further discussed with reference to FIG. 6B.

Referring again to FIG. 4, at step 408, the location of the contact event is determined by the system. The location may be measured in for example, X-Y coordinates, centimeter, millimeters, pixels, or similar measurement, and may be calculated from a predetermined position on the virtual keyboard. The predetermined position used to interpret the contact event may vary depending on the location of the contact event. For example, the predetermined position may be based on the set of home row keys (i.e., A, S, D, F, J, K, L, ;), with the predetermined position used to interpret the contact event being the closest home key associated with the detected contact event. A contact event near the letter "M" would therefore be associated with the predetermined position of the home key "J" whereas a contact event near the letter "W" would be associated with the predetermined position of the home key "F". In other embodiments, the predetermined position may be a single location relative to the keys displayed on the virtual keyboard, such as a midpoint of the virtual keyboard or a corner or edge of the touchscreen. The contact event location may then be calculated from an approximate central point in the surface area covered by the contact event and the predetermined location. The location of contact events is further discussed with reference to FIGS. 7-10.

At step 410, the system determines whether any additional contact events need to be assessed. If additional contact events have been detected within the sampling timeframe, processing returns to step 402 where the next contact event to be assessed is selected. If no additional contact events have been detected within the sampling timeframe, processing continues to step 412.

At step 412, all three factors discussed above are used to analyze the detected contact events. In some embodiments, only the duration and size of the detected contact events are analyzed and compared to determine the intended key press. In such an embodiment, the location of the contact event is not calculated unless further information is needed to determine the intended key. Each of the aforementioned factors may be used to calculate a probability that a detected contact event is the intended key press. Each factor is assessed to calculate a probability that the detected contact event represents an intended key press, and a sum of the probability is then used to determine an overall confidence level that a particular contact event is an intended key press. If an intended key is not clearly discernable, such as by having a confidence level that is no greater than other simultaneously-detected contact events, the system can further interpret the contact events based on additional factors. Some examples of these factors are discussed in the following paragraphs.

In some embodiments, cadence data may also be utilized to determine if a detected contact event is an intended key press. For example, if a user is entering text and commonly breaks between words, at the end of sentences, or at periodic intervals while typing, the pattern of expected breaks can be taken into account when interpreting the contact events. Accordingly, when a user is entering text, the next contact event detected on the virtual keyboard can be analyzed by applying a cadence criteria to determine if that contact event is an intended key press or an accidental contact event. Contact events that occur at a time that is consistent with the user's cadence (i.e., the contact event occurs at an expected time based on the user's cadence) may have a greater likelihood of being judged as a key press, whereas contact events that occur at a time that is not consistent with the user's cadence (i.e., the contact event occurs at a time that is not expected based on the user's cadence) may have a lesser likelihood of being judged as a key press. The cadence pattern for any particular user may be assessed by collecting contact event data over a predetermined time interval for the user in order to identify the user's cadence pattern. Alternatively, a cadence pattern may be determined by analyzing a population of like users to determine a cadence pattern that may be applied to the user.

In some embodiments, the system may track a shift of the user's hands and may apply a correction factor to account for the shift. For example, the user's hands may naturally drift during use of the virtual keyboard. Accordingly, each contact event may be detected a distance from a desired location where the user would like to interact with the keyboard. The system may recognize these variances and apply a correction factor to the position of each contact event to correct for the drift. For example, if a user continually inputs a "U" for a "Y", the device may recognize this consistent error and shift the location of the contact events so that they are mapped to the correct keys on the virtual keyboard.

The methods described with reference to FIGS. 3-5 will now be described with reference to corresponding examples. In the following FIGS. 6-10 exemplary embodiments of virtual keyboards, contact events on virtual keyboards, and thresholds applied to those contact events are illustrated and described.

Exemplary Embodiments

As discussed above, the disclosed system and methods are directed to determining whether a detected contact event is an intended key press based on a variety of different factors that characterize the contact event. The present system and methods take into account that each user differs in keyboard entry techniques. For example, some users may hover their fingers while typing, others may rest their hands on the keyboard, some may tap on the keyboard while typing, and others may not. Additionally, the present system and methods can detect the presence of multiple contact events due to user error such as, mistypes, drifting, and sliding on the flat surface where the virtual keyboard is displayed.

As with traditional physical keyboards, users often find a resting point on the keys of electronic keyboards while typing and at time intervals between typing. In fact, users often rest their hands on the screen of the device while typing and/or hold a portion of the screen while typing with only one hand. For example, if a user is typing on a tablet computer, that user may rest his or her palms along the bottom of the touchscreen. In the case of a smartphone, a user may rest only his or her thumbs on the screen. Additionally, the keys that a user may rest on may depend on the format of the keyboard, the language of the keyboard, the size of the keyboard, the application providing the keyboard, etc. Each of these various situations is addressed in the following examples.

Figure 5:
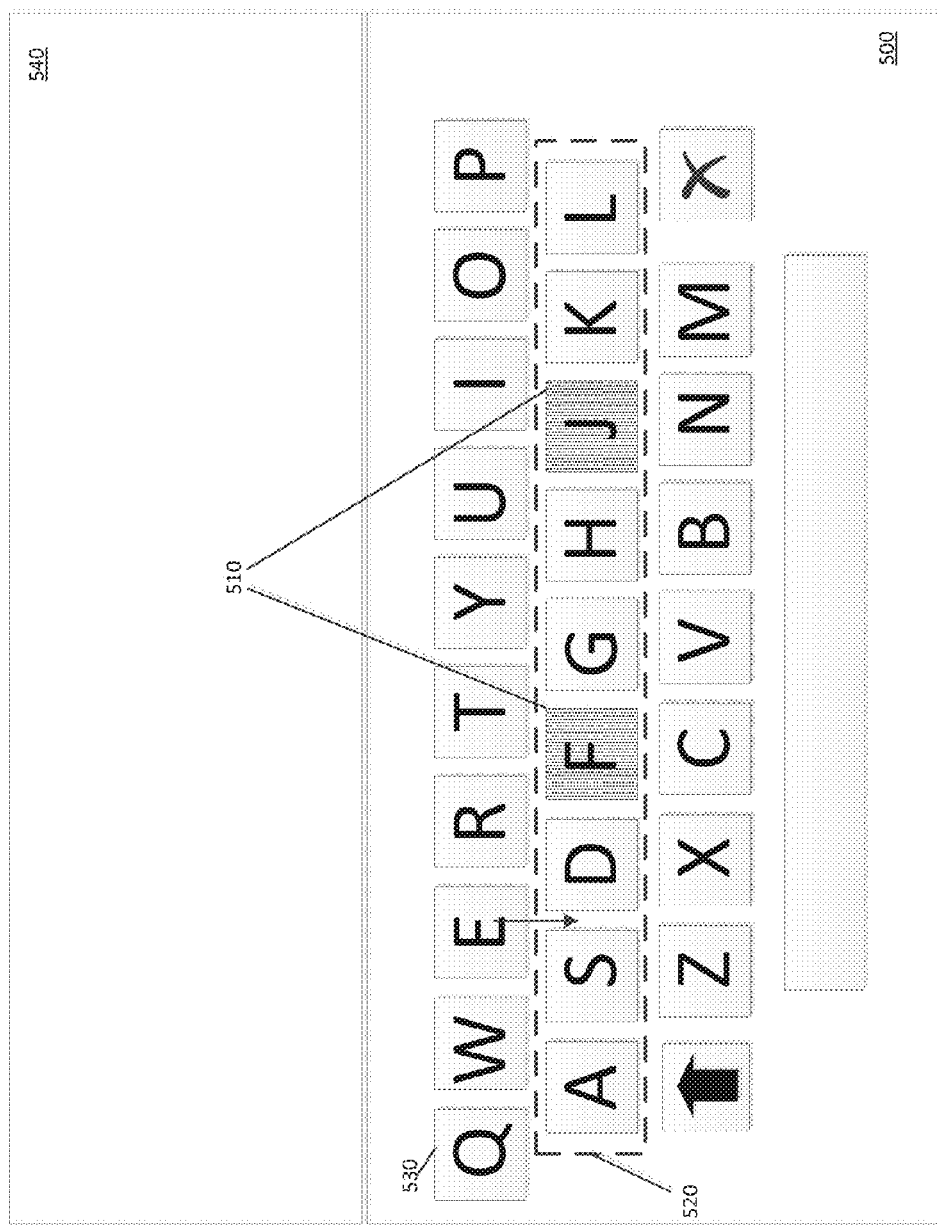
FIG. 5 illustrates an exemplary virtual keyboard displayed on a touchscreen.

In FIG. 5, an exemplary virtual keyboard 500 is illustrated. The virtual keyboard may be displayed on a touchscreen of a computing device, such as a tablet computer or smartphone.

The virtual keyboard is typically displayed on a portion of the display screen, leaving the remainder of the display screen 540 for a user to view the text entered on the virtual keyboard 500.

The virtual keyboard 500 may be a QWERTY keyboard or any other keyboard known and commonly used in the art and based on the language in which the user is entering text. In the embodiment shown in FIG. 5, a home row 520 of keys is located across the middle row of the keyboard. The home row includes two home keys "F" and "J" which users of physical keyboards often use as a starting resting location for their index fingers. The keys 530 on the virtual keyboard may vary in size depending on how many keys are displayed on the keyboard and the display size of the computing device on which the keyboard is provided.

Depending on the display size of the computing device, the interpretation application may utilize differing thresholds to assess when an intended key press is made. For example, if the display of the computing device is on a smartphone, the surface area of the contact made on the virtual keyboard for each contact event will most likely be much larger relative to the size of the virtual keyboard than on a touchscreen monitor of a desktop computer. These factors can be included in the application software such that each type of device utilizes differing thresholds.

Figure 6A:
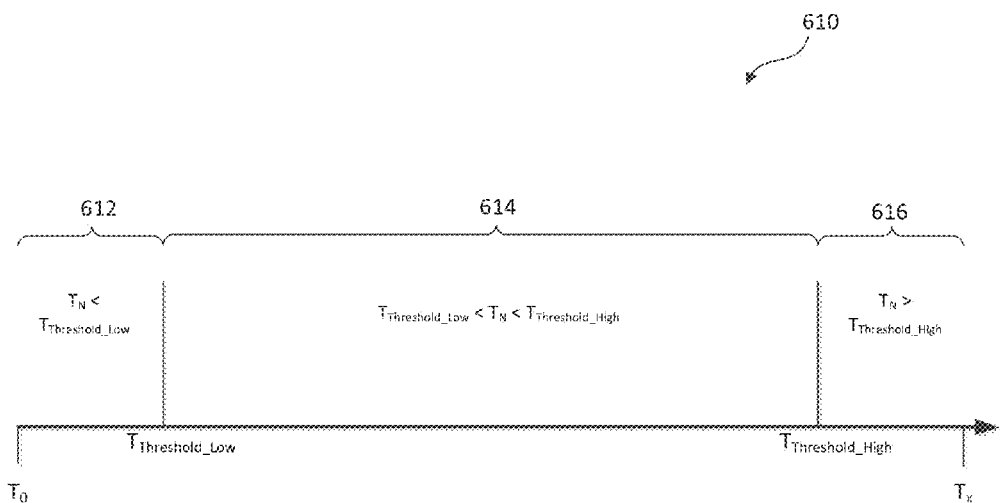
FIG. 6A illustrates a time diagram of threshold limits for durations of contact events associated with a virtual keyboard.
Figure 6B:
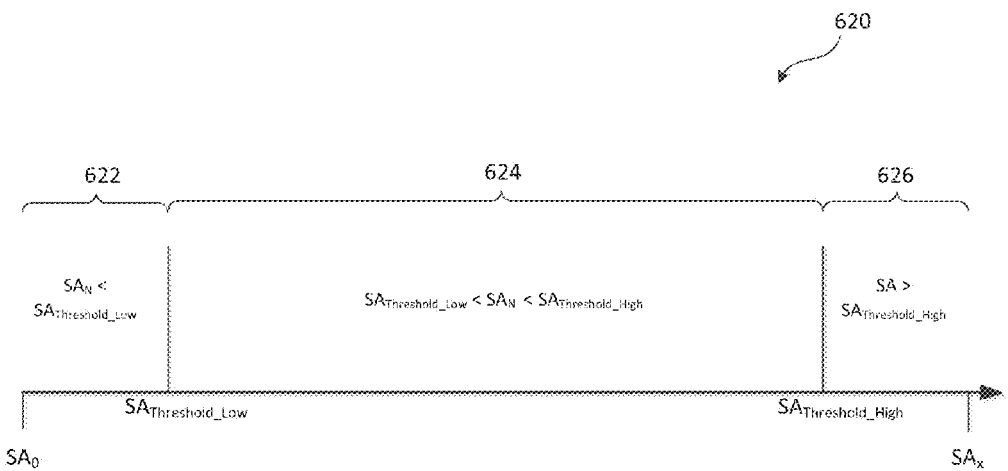
FIG. 6B illustrates a surface area diagram of threshold limits for a surface area covered by contact events associated with a virtual keyboard.
Figure 7:
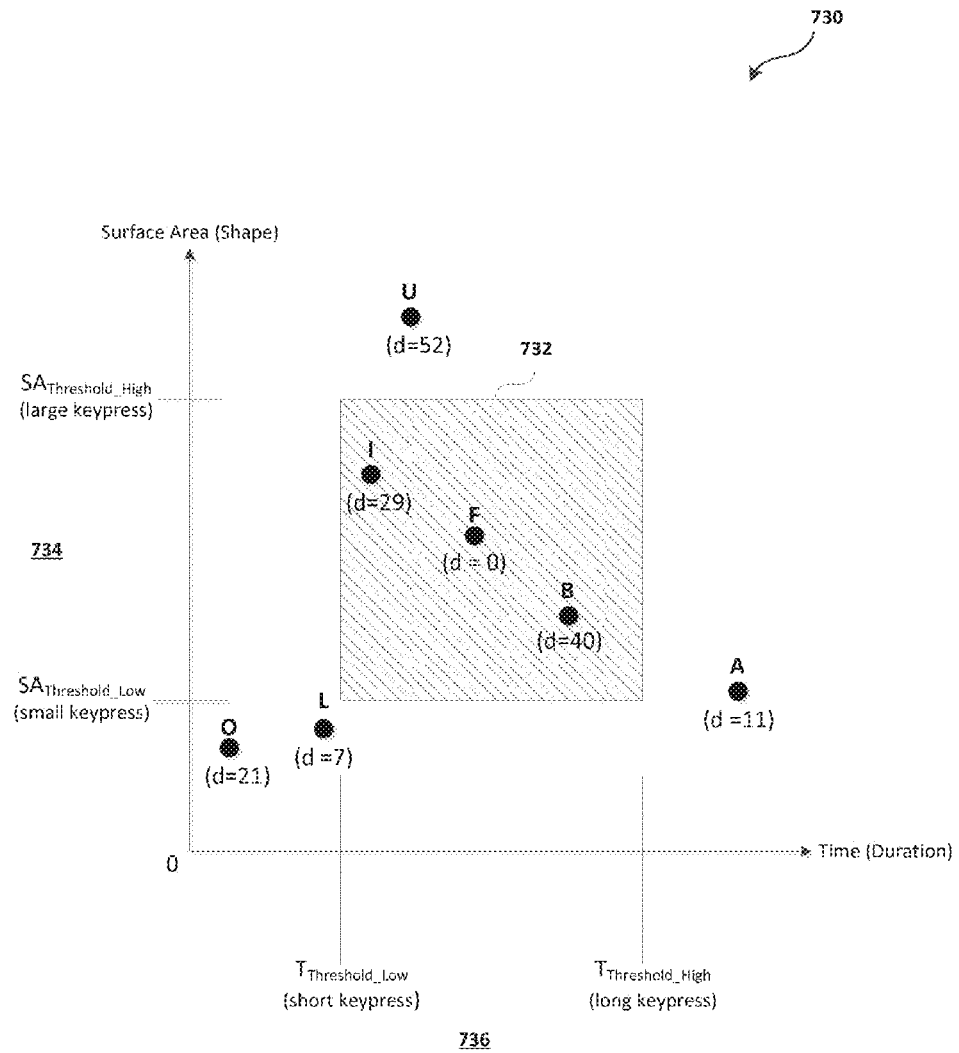
FIG. 7 is a graphical representation of threshold limits for contact events including exemplary contact points and associated locations on a virtual keyboard.

FIGS. 6A and 6B illustrate exemplary thresholds that may be used to assess detected contact events on a virtual keyboard. FIG. 7 illustrates a combined graph indicating both the thresholds of FIGS. 6A and 6B and also indicating a location of each detect contact event.

FIG. 6A illustrates a threshold interval 610 that is utilized to determine whether a detected contact event is considered to be an intended key press or not. The depicted timeline reflects possible contact event durations ranging from $T_0$ to $T_x$. Contact events having a duration $T_N$ that falls between $T_0$ and a lower threshold value, $T_{Threshold\_Low}$, i.e., within low range 612, would not be considered as an intended key press because the duration of time for that contact event is too short. For example, if a user accidentally touched a key for a brief instant while entering another intended key, the accidental touch would not be considered an intended key.

Similarly, contact events having a duration $T_N$ that falls above a higher threshold value, $T_{Threshold\_High}$, i.e., within high range 616, would not be considered as an intended key press. For example, if a user rested his/her hands on one or more keys instead of hovering above a virtual keyboard, the duration of the detected contact events on those keys would be substantially longer than for an intended key press. So, those detected contact events would be removed from consideration as the duration for each of them is above the high threshold.

If the duration $T_N$ of a detected contact event falls within the prescribed threshold time interval 614, the interpretation application can further process that detected contact event based on additional criteria to determine if it is an intended key press. For example, if the detected contact event is within the time interval between $T_{Threshold\_Low}$ and $T_{Threshold\_High}$, that contact event can additionally be analyzed based on a size of the contact made with the touchscreen, as illustrated in FIG. 6B.

FIG. 6B illustrates a threshold interval 620 that is used to assess a size of a contact event to determine whether the detected contact event should be considered an intended key press or not. The size is a measure of the surface area covered by contact made with the touchscreen on the computing device. In some embodiments, the size may be measured by a range of X-Y coordinates associated with a contact event and defining an area. For example, the size may be measured in pixels, square centimeters, or other unit of measure.

As illustrated in the example embodiment of FIG. 6B, a contact event having a surface area $SA_N$ that is less than a low threshold value $SA_{Threshold\_Low}$, i.e., within a low range 622, are likely to reflect an accidental touch while typing an intended key. This type of touch may also be referred to as a ghost touch that often occurs on the keys proximate to the intended key. These mistaken touches may often be made more quickly than the intended key, so the smaller size of the contact event along with a shorter duration of the contact event may be used to indicate to the interpretation application that an accidental touch occurred and additionally aid in removing that particular contact event from consideration as an intended key press.

In contrast, a contact event having a surface area $SA_N$ that is greater than a high threshold value $SA_{Threshold\_High}$, i.e., within a high range 626, includes any contact event over a predetermined size. Contact events exceeding the high threshold value could include accidental extended touches on the virtual keyboard, such as when a user fails to pick up his/her finger or hand while moving to type an intended key thereby generating a sliding motion across the keyboard. In another example, the user may rest his/her palms on the virtual keyboard in order to hover above the home rows keys in preparation to type. These contact event sizes would likely measure above the high size threshold and be removed from consideration as potential key presses by the interpretation application.

The prescribed surface area threshold range 624 between the low threshold value and the high threshold value thereby defines the range in which a contact event may be considered to be an intended key press. The prescribed surface area range can vary in order to take into consideration differing sizes of hands, sizes of virtual keyboards, type of device typing styles, etc. If the size of the detected contact event falls within the prescribed threshold interval 624, additional factors may also be analyzed in order to determine if the contact event is an intended key press. For example, if the user taps the home keys of the virtual keyboard in the interim between entering text (e.g., while thinking), these taps may inadvertently be considered intended keys if additional criteria are not applied to the detected contact event.

Referring now to FIG. 7, an exemplary graph 730 which depicts three factors by which multiple contact events can be evaluated, or assessed, is provided. The X-axis 736 of the graph represents the duration of a contact event. Those contact events having durations that fall between the $T_{Threshold\_Low}$ value and the $T_{Threshold\_High}$ value are considered as potential key presses; those contact events having durations that fall outside of this range may be discarded as potential key presses. The y-axis 734 of the graph represents the surface area of a contact event. Those contact events that fall between the $SA_{Threshold\_Low}$ value and the $SA_{Threshold\_High}$ value are considered as potential key presses; those contact events having surface areas that fall outside of this range may be discarded as potential key presses. The two ranges thereby define a region 732 in which a contact event may be considered an intended key press. The region 732 includes contact events meeting both the size threshold and the time threshold requirements.

From the graph 730 it can be easily determined which detected contact events are most likely to be intended key presses. For example, those within the region 732 are within predetermined threshold values and, therefore, have a higher probability or confidence level of being an intended key press as determined by the interpretation application module.

In addition to the time and surface area of a contact event, the distance of the contact event from a reference location can also be a factor affecting whether a detected contact event is determined to be an intended key press or not. The distance from the home keys, for example, may be correlated with the likelihood that the contact event is a key press since contact events detected a longer distance from the home keys are more likely to be intended key presses than certain contact events associated with a home key or one immediately adjacent to it. Variations in the pressure, size and duration of contact events detected on the home keys are common as a user moves or pauses during typing. However, variations detected on a key such as a "P" or "Q" would be unlikely as a user is required to make a more deliberate action in order to contact that key. Distance from the reference location may also be utilized to assess repeat contact events detected on the same key which are accidental, or numerous proximate contact events having relatively similar distances from the home keys, which are likely accidental due to, e.g., drifting.

Distance may be measured or calculated from corners of a touchscreen or in relation to known locations of keys or commonly detected pressure points on the touchscreen of the computing device. As previously discussed, the home row and/or keys "F" and "J" found on common physical keyboards may be used as the reference location. The particular reference location used may depend on the size of the virtual keyboard generated for display on the touchscreen of the computing device. For example, in the case of a tablet computer, the virtual keyboard may be larger than on a mobile phone. Accordingly, the larger keyboard may promote users to use the home keys as resting keys while hovering, and the home keys are therefore suitable reference locations. In contrast, mobile phones have smaller keyboards and two-finger contact events (e.g., thumbs) may be used more commonly on mobile phones. As such, different reference locations may be used for mobile phones.

Each exemplary contact events indicated on the graph in FIG. 7 will now be discussed to determine whether each contact event should be interpreted as an intended key press or disregarded. Starting with point "O", the size of the contact event falls below the size threshold as well as the duration threshold. Point "O" appears to be a mistaken contact event, such as an accidental touch on the virtual keyboard or a ghost contact event to an intended key. If the distance is measured on a scale between 0 and 60 mm (for example) from the home keys of the device, the touch appears to be a good distance (d=21 mm) away from the home keys. Such a distance most likely indicates a ghost touch by the user.

In order to calculate the likelihood that the contact event is an intended key press, the contact event may be assigned a confidence level based on two or more factors, e.g., the size of the contact event, the duration of contact event, and the distance of the contact event from a reference location. A confidence level is then assigned to the contact event as to whether it is likely or not likely to have been an intended key press. Based on the short time of contact, small surface area, and distance from the home location, the contact event "O" is likely to be an accidental touch. In order to help confirm that point "O" is an accidental touch, the interpretation application may analyze additional contact events detected at the same or substantially the same time and determine whether another touch is located proximate to contact event "O". If another contact event is detected (e.g., at point "I"), the device assesses a confidence level that the contact event at "I" is likely to reflect an intended key press. Since contact event "I" falls between the high and low thresholds for both size and duration, contact event "I" is likely to be an intended key press. Such a determination reinforces the initial analysis that contact event "O" is most likely a ghost contact event. The interpretation application may therefore lower the confidence level that corresponding contact event "O" is an intended key and increase the confidence level that corresponding contact event "I" is an intended key.

Figure 8:
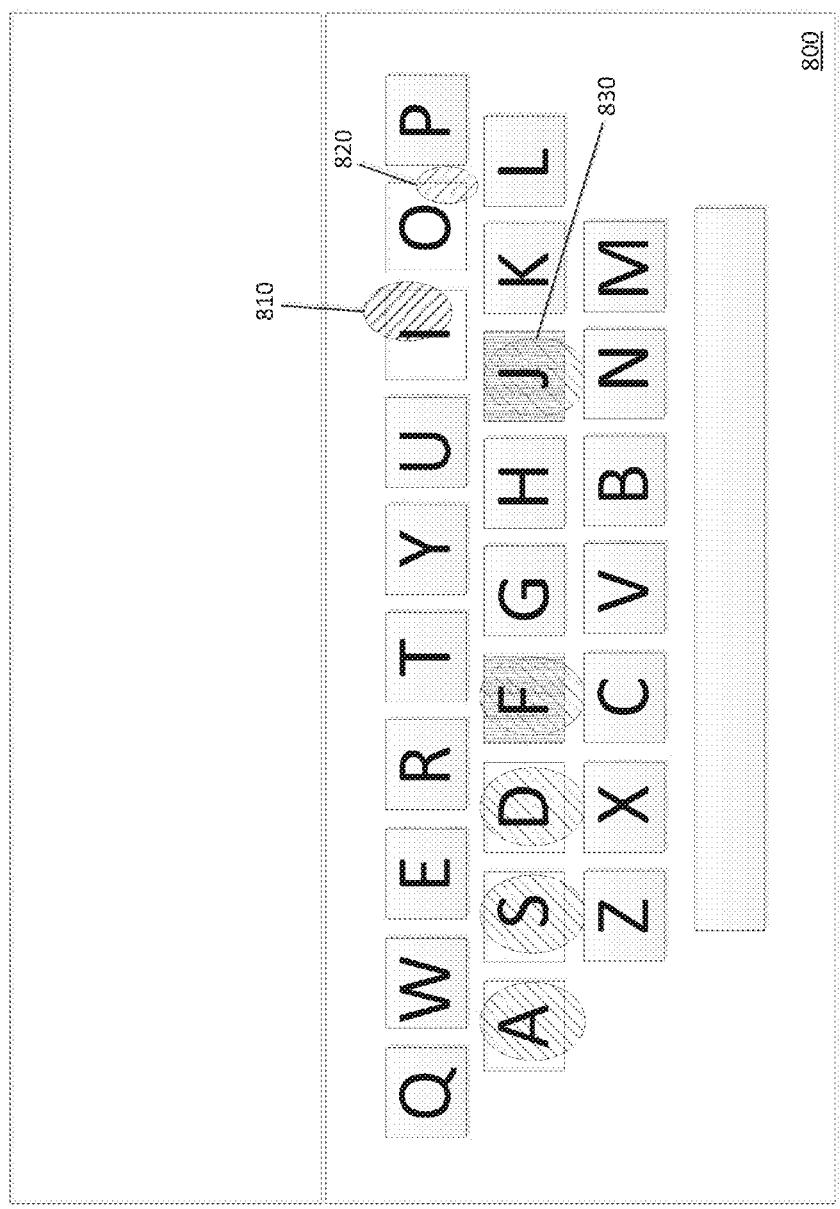
FIG. 8 illustrates exemplary contact events in relation to a set of home keys on a virtual keyboard.

In FIG. 8, an exemplary virtual keyboard 800 on which contact event "O" and contact event "I" from the graph in FIG. 7 are illustrated. As shown, the home row keys 830 (i.e., A, S, D, F, J, K, L, etc.) are used as resting keys for a user. The user initiates a contact event 810 to enter "I" as an intended key. Proximate to the "I" contact event 810 is shown a smaller contact event 820 on the letter "O" that is a shorter duration. The contact event 820 for the letter "O" corresponds to point "O" on the graph in FIG. 7, which is a ghost touch associated with an intended key. The distance indicated in FIG. 7 may be a distance the contact events are measured from the home key "J". So, the confidence level that the device assesses for contact event "O" and contact event "I" solely based on the three factors of location, size and duration, may be 90% that contact event "I" is an intended key press and 10% that contact event "O" is an intended key press. Based on this analysis, the interpretation application would then designate the letter "I" as the intended key and provide the input key letter to the word prediction algorithm such that a word containing that letter can be suggested to the user.

Referring back to FIG. 7, point "F" and point "B" are both points corresponding to contact events that fall well within the combined region 732 for contact size and contact duration. If both events were received at the same time, the interpretation application may determine that both contact event points are considered candidate key presses (e.g., 50/50 probability/confidence level for each) and further processing is needed to conclude which is more likely to be the intended key. Such processing continues until at least one of the contact events is determined to have a probability/confidence that is a threshold amount above other detected contact events. For example, in a group of three contact events, the confidence level of a particular contact event may be only 50%, but the other two may have confidence levels of 30% and 20%. Under such circumstances, the confidence level of 50% is sufficient to conclude that it is the intended key. The threshold value may be, for example, a certain percentage (e.g., 20%) higher than other contact events detected at the same time.

Still referring to FIG. 7, in order to additionally analyze the two contact events "F" and "J" that are detected in close proximity, additional criteria may be utilized such as the distance as measured from the home keys "F" and "J". For example, contact event "B" is measured at a distance of forty (d=40) from home key "F" and contact event "F" is measured at a distance of zero (d=0) because it is considered contact made with the home key from which it is being measured. The distance for each key on the keyboard can be measured from a respective side of the keyboard, e.g., from home key "F" for contact events made with the left hand and from home key "J" for contact events made with the right hand. In other embodiments, the distance for each key on the keyboard 900 may be made from the respective home row key from which the contact event mechanism originated. For example, key "C" is measured from key "D" and key "O" is measured from key "L" and so on. In order to properly interpret which one of these two detected contact events is the intended key press, the interpretation application may compare the distance measurement of each contact event. The farther the distance from the home/originating key, the more likely the detected contact event is an intended key press.

Figure 9:
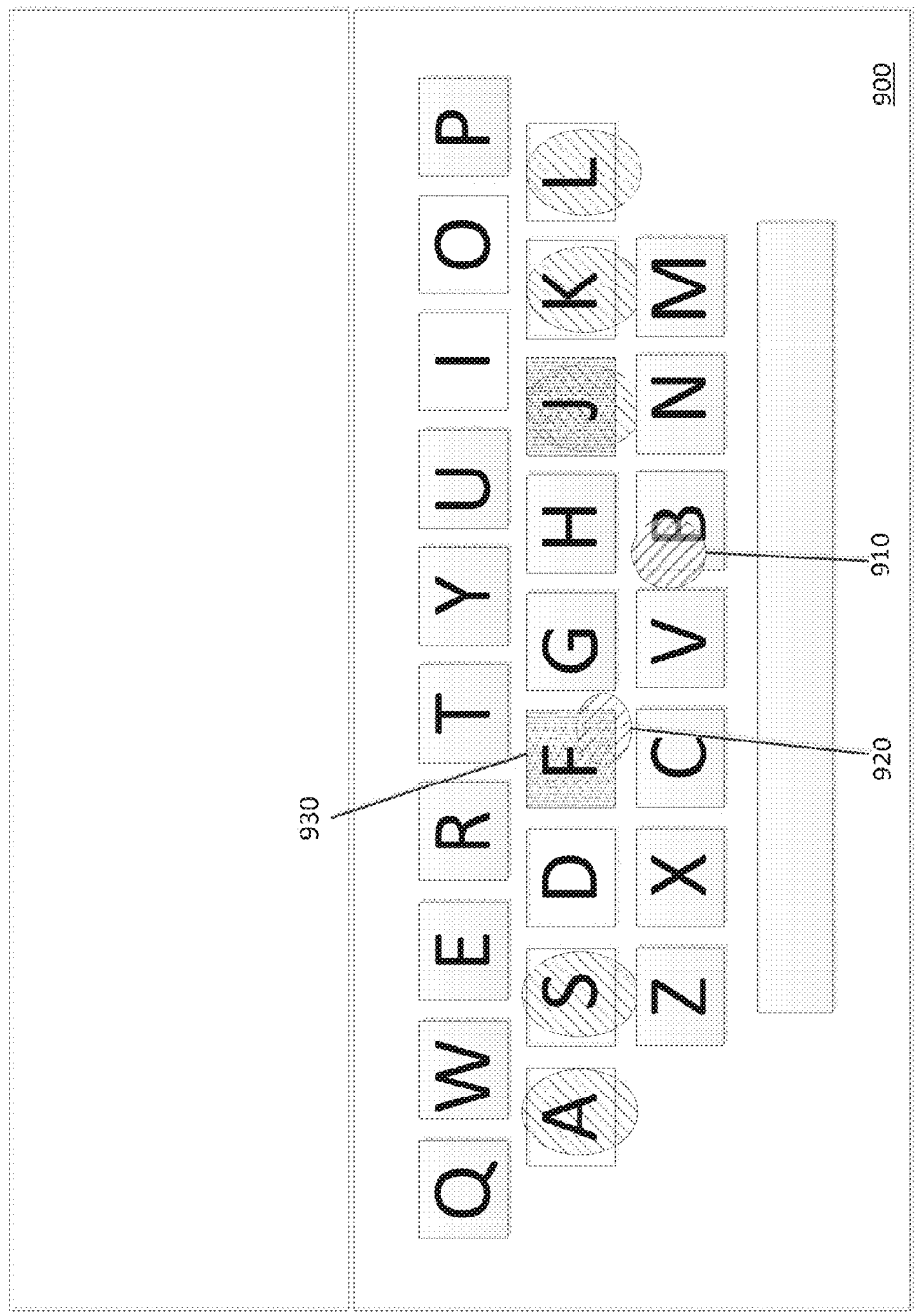
FIG. 9 illustrates another embodiment of exemplary contact events in relation to a set of home keys on a virtual keyboard.

In FIG. 9, for example, contact event "F" 920 and contact event "B" 910 are depicted on a virtual keyboard 900. As illustrated on the keyboard 900, home key "F" 930 is also indicated as the point from which each detected contact event is measured. The contact point for the detected contact event "F" appears to be smaller in size than the contact point for contact event "B" and slightly displaced from the center of home key "F" even though that is considered a home resting point. This is because the contact event "F" is a ghost key to the real, or intended contact event "B". The computing device may process each of these contact events independently at first, but correlate the two based on proximity in time and therefore treat both as candidates for an intended key press. The secondary analysis involving additional factors may then be utilized to determine which is the more likely key press (e.g., assessing which is a greater distance from home key "F"). In the depicted case, the contact event "B" is determined as the intended key. However, if each of the aforementioned contact events were equidistant from the home key, additional factors may be considered to determine which key is the intended key. For example, additional characteristics of the contact events may be analyzed such as the proximity of each contact event to one another, whether a contact event was received at a predicted cadence, etc.

Referring again to FIG. 7, point "L", point "A", and point "U" are illustrated as lying outside the combined region 732 for contact event size and duration. Each of the points correspond to a contact event "L", contact event "A", and contact event "U", respectively. Point "U" is above the size threshold, meaning that the surface area made on contact was assessed as too large to be a likely key press by the interpretation application. However, the duration of the contact event is within the threshold time interval, which increases the probability of the contact event corresponding to point "U" as being the intended key press. Additionally, the distance measured from the home position or home key is long (d=52), so the probability of point "U" being the intended key press also increases according to this criteria.

Next, as shown on the graph 730 point "A" is also located outside the combined region 732 for size and duration of a contact event. Point "A" is, however, within the size thresholds for consideration as an intended key press. The size of the contact event increases the probability that the corresponding contact event "A" is the intended key press. Of note in regard to point "A" is the short distance from a home key or resting location (d=11) and the exceeded threshold for duration, indicating a long key press at a location proximate to home location. The home location can include, for example, a home key or resting key where a user commonly rests input mechanisms, stylus, hand, fingers, between entering text on the virtual keyboard. The long duration may indicate a drifting finger on the flat display of the touchscreen on the computing device, rather than an intended key press. Because the virtual keyboard input has no physical variations (e.g., bumps, edges, etc.) to differentiate keys or home keys, a user of the device may not notice if his/her hands drift while in a resting position on the touchscreen.

Finally, point "L" is shown on the graph 730 located outside the combined region 732 as well. Point "L" is outside both the size and duration ranges, with a duration and a size both below the threshold values. Accordingly, the corresponding detected contact event "L" is a small and quick contact point on the virtual keyboard. The proximity of contact event "L" to a home key or resting location further validates that the user may have accidently moved from a home or resting location while typing the intended key. Whatever the case, because point "L" is independently outside both thresholds and is proximate to a home location, the probability that the contact event "L" is the intended key press is low and the confidence level for that contact event is set by the interpretation application to zero or a low value. This calculation may differ, however, based on the number of detected contact events being assessed at any given time as well as for additional factors both dependent and independent of the other detected contact events.

Figure 10:
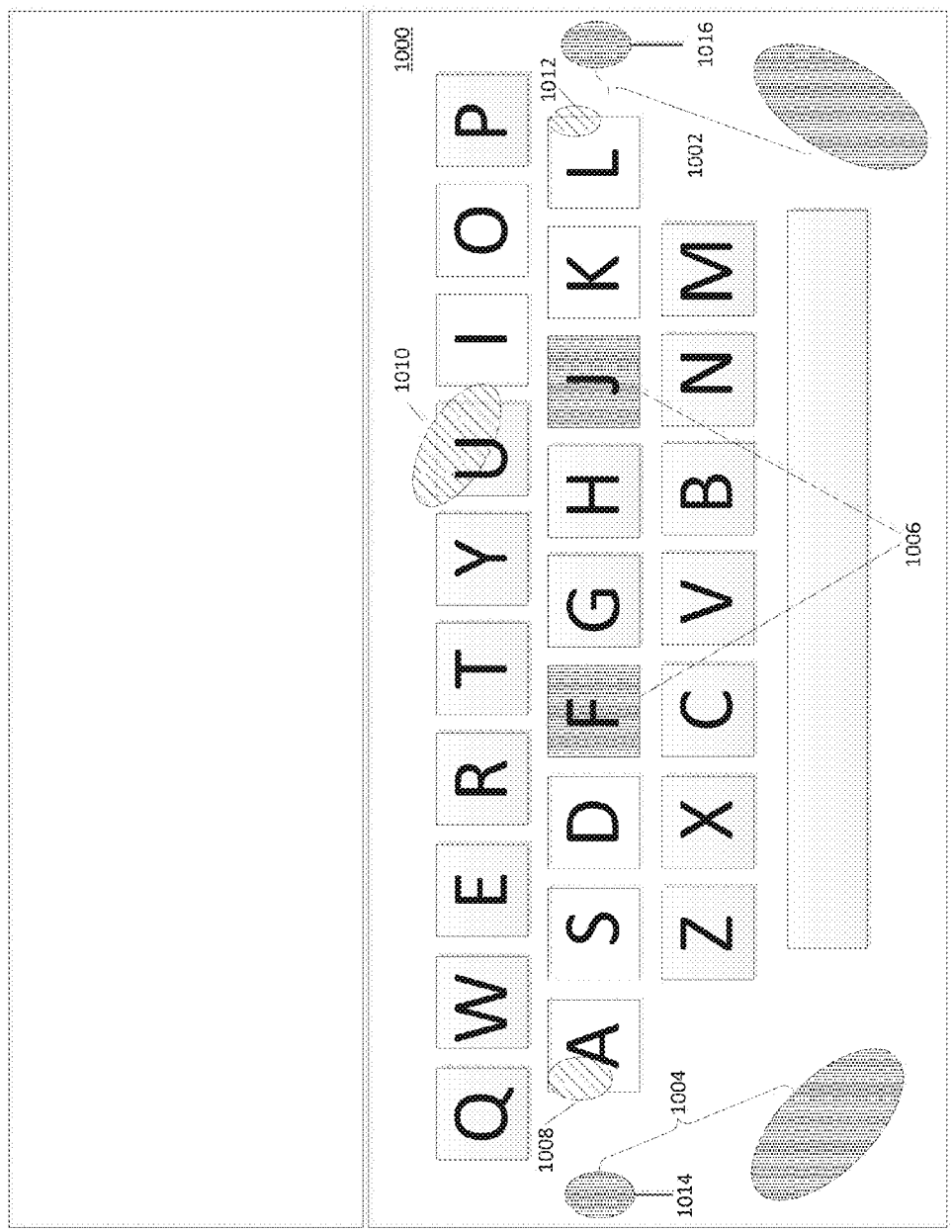
FIG. 10 illustrates exemplary contact events in relation to an alternative set of home keys on a virtual keyboard.

FIG. 10 illustrates an exemplary virtual keyboard 1000 displayed on a touchscreen of a computing device in which example contact events corresponding to point "U", point "A" and point "L" are displayed. The embodiment illustrated in FIG. 10 differs from those illustrated in FIGS. 8-9 because the home keys, or resting location of the user's hands, differs. Instead of resting fingers on the home keys, the user of the depicted device rests his/her palms and one finger on the keyboard while hovering the rest of his/her hand above the virtual keyboard until entering text. Accordingly, after several uses, the computing device may collect data regarding the habitual entry methods by that user and then may modify thresholds and/or other factors used by the interpretation application to accommodate that user. For example, the resting keys, or home location of each detected contact event may be measured from the top input areas 1014, 1016, of the two resting points 1004, 1002, on the display.

Still referring to FIG. 10, the contact event "U" 1010 corresponding to point "U", contact event "L" 1012 corresponding to point "L", and contact event "A" corresponding to point "A" are shown on virtual keyboard 1000 as detected contact events which are analyzed through the interpretation application executed by a processor of the computing device. Contact event "A" may have a distance (d=11) measured from the resting contact point 1014, which is considered the 'home key' on the left side of the keyboard. The size of contact event "A" indicates that it is a candidate for the intended key press though its proximity to home key 1014 may indicate that the user's finger drifted while resting on the flat display screen surface. The interpretation of "A" as a finger drift is further supported by the duration of the contact event "A" being well beyond the high threshold value for detected contact events, as indicated by point "A" on graph 730 in FIG. 7.

As illustrated on the keyboard 1000 in FIG. 10, contact event "U" is a large contact event extending across the face of the "U" key. The contact event is also a long distance from the home location 1016 from which its location is measured. Though the device indicates that the size is above a threshold level, this may have occurred due to the user sliding his/her finger across the touchscreen instead of performing a simple touch up, touch down motion. However, based on the other characteristics of the contact event "U", the interpretation application can still determine with sufficient confidence that contact event "U", is the intended key press. For example, contact event "U" is a far distance from the resting key or home location of the input mechanism (e.g. the user's hand). Additionally, as illustrated on graph 730, the duration of the contact event is within the threshold time interval for an intended key press. So, with relatively high confidence, contact event "U" can be designated as the intended key press and further verified after analysis of the remaining detected contact events, e.g., contact event "L".

Lastly, contact event "L" 1012 is a small sized contact event made proximate to the home location 1016 for the user. So, based on these two factors, the probability that contact event "L" is an intended key press is relatively low. From the graph in FIG. 7,the device indicates that contact event "L" also is a fast contact event, having a below threshold duration. Additional comparison to the other two detected contact events can further verify that contact event "L" is a ghost touch because its proximity to the intended key candidate contact event "U", which has a substantially higher confidence level. Therefore, the contact event "L" is provided an even lower confidence level and is concluded to be a ghost contact event to the intended key "U".

Though only up to three contact event points are discussed with reference to FIG. 7 and corresponding FIGS. 8-10, it will be appreciated that multiple detected contact events may be assessed by the interpretation application module at any one time. Similarly, those detected contact events may be utilized in order to further calculate a probability and associated confidence level for each of those detected contact events based on the attributes of one another, as discussed above with only two contact events.

It will be appreciated that the techniques disclosed herein associated with a touchscreen may be equally applicable to other touch input technologies such as a touch pad or graphics tablet.

Moreover, additional embodiments that may be utilized as factors for calculating a probability and confidence level of each detected contact event may be utilized.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for interpreting contact events on a virtual keyboard, the method comprising:
    detecting multiple contact events on a virtual keyboard generated on a touchscreen of a computing device, the multiple contact events a result of a user's interaction with the touchscreen;
    for each detected contact event:
        determining that a duration of the contact event falls within a threshold time range associated with an intended key press;
        determining that a surface area of the contact event falls within a threshold surface area range associated with an intended key press; and
        interpreting the contact event as an intended key press when the duration of the contact event falls within the threshold time interval and the surface area of the contact event surface area falls within the threshold surface area range; or
        interpreting the contact event as an unintended key press when the duration of the contact event falls outside the threshold time interval and the surface area of the contact event surface area falls outside the threshold surface area range; and
    inputting the intended key presses for each of the detected contact events into a prediction application that selectively displays one or more predicted words via the virtual keyboard.

2. The method of claim 1, wherein if more than one of the multiple contact events is identified as an intended key press:
    determining a distance of each of the contact events identified as an intended key press, wherein the distance is a position of a contact event relative to a reference location on the virtual keyboard; and
    comparing each of the contact events based on associated distances to determine whether any of the contact events should not be interpreted as a key press.

3. The method of claim 2, wherein a reference location corresponds to one of the home keys on a QWERTY keyboard.

4. The method of claim 2, wherein, if more than one of the multiple contact events is still identified as an intended key press, further analyzing the contact event based on a location of the contact event.

5. The method of claim 4, further comprising:
    determining if the duration of the contact event falls within a first time interval,
        wherein the first time interval includes a set of reference locations, and
        wherein the location of contact event within the first time interval does not vary over the first time interval; and
    determining if the duration of the contact event falls within a second time interval,
        wherein the second time interval includes at least one transition contact event; and
        wherein the second time interval is shorter than the first time interval.

6. The method of claim 1, further comprising calculating a probability for each contact event that the contact event is an intended key press.

7. The method of claim 6, wherein calculating a probability for a contact event comprises:
    calculating a probability that the duration of the contact event implies an intended key press;
    calculating a probability that the surface area of the contact event implies an intended key press; and
    summing the calculated probabilities associated with the contact event to generate an overall probability that the detected contact event should be interpreted as an intended key press.

8. The method of claim 7, further comprising adjusting the calculated probability for a contact event based on a distance that each contact event is located from a reference location.

9. The method of claim 8, further comprising adjusting the calculated probability based on characteristics of other contact events.

10. A non-transitory computer-readable storage medium whose contents, when executed by a computing device, cause the computing device to perform operations for interpreting contact events on a virtual keyboard, the operations comprising:
    detecting multiple contact events on a virtual keyboard generated on a touchscreen of a computing device, the multiple contact events a result of a user's interaction with the touchscreen;
    for each detected contact event:
        determining that a duration of the contact event falls within a threshold time range associated with an intended key press;
        determining that a surface area of the contact event falls within a threshold surface area range associated with an intended key press; and
        interpreting the contact event as an intended key press when the duration of the contact event falls within the threshold time interval and the surface area of the contact event surface area falls within the threshold surface area range, or
        interpreting the contact event as an unintended key press when the duration of the contact event falls outside the threshold time interval and the surface area of the contact event surface area falls outside the threshold surface area range; and inputting the intended key presses for each of the detected contact events into a prediction application that selectively displays one or more predicted words via the virtual keyboard.

11. The computer-readable storage medium of claim 10, wherein if more than one of the multiple contact events is identified as an intended key press:
   determining a distance of each of the contact events identified as an intended key press, wherein the distance is a position of a contact event relative to a reference location on the virtual keyboard; and
   comparing each of the contact events based on associated distances to determine whether any of the contact events should not be interpreted as a key press.

12. The computer-readable storage medium of claim 11, wherein a reference location corresponds to one of the home keys on a QWERTY keyboard.

13. The computer-readable storage medium claim 11, wherein, if more than one of the multiple contact events is still identified as an intended key press, further analyzing the contact event based on a location of the contact event.

14. The computer-readable storage medium of claim 13, further comprising:
   determining if the duration of the contact event falls within a first time interval,
      wherein the first time interval includes a set of reference locations, and
      wherein the location of contact event within the first time interval does not vary over the first time interval; and
   determining if the duration of the contact event falls within a second time interval,
      wherein the second time interval includes at least one transition contact event; and
      wherein the second time interval is shorter than the first time interval.

15. The computer-readable storage medium of claim 10, further comprising calculating a probability for each contact event that the contact event is an intended key press.

16. The computer-readable storage medium of claim 15, wherein calculating a probability for a contact event comprises:
   calculating a probability that the duration of the contact event implies an intended key press;
   calculating a probability that the surface area of the contact event implies an intended key press; and
   summing the calculated probabilities associated with the contact event to generate an overall probability that the detected contact event should be interpreted as an intended key press.

17. The computer-readable storage medium of claim 16, further comprising adjusting the calculated probability for a contact event based on a distance that each contact event is located from a reference location.

18. The computer-readable storage medium of claim 17, further comprising adjusting the calculated probability based on characteristics of other contact events.

19. A method, comprising:
   detecting multiple simultaneous contact events input to a virtual keyboard displayed by a mobile device;
   for each of the multiple simultaneous contact events, identifying a single contact event having a first characteristic of a duration of the contact event that satisfies a threshold time range associated with an intended key press of a key of the virtual keyboard, and a second characteristic of having a surface area of the contact event that satisfies a threshold surface area range associated with the intended key press of the key of the virtual keyboard; and
   inputting text represented by the key of the virtual keyboard associated with the identified single contact event into a text string displayed by the virtual keyboard.

\* \* \* \* \*